(12) United States Patent
Houle et al.

(10) Patent No.: US 10,237,421 B2
(45) Date of Patent: Mar. 19, 2019

(54) PRINTERS AND METHODS FOR IDENTIFYING A SOURCE OF A PROBLEM THEREIN

(71) Applicant: Datamax-O'Neil Corporation, Orlando, FL (US)

(72) Inventors: Scott Houle, Kingston, WA (US); Thomas Celinder, Singapore (SG)

(73) Assignee: DATAMAX-O'NEIL CORPORATION, Orlando, FL (US)

( * ) Notice: Subject to any disclaimer, the term of this patent is extended or adjusted under 35 U.S.C. 154(b) by 85 days.

(21) Appl. No.: 15/388,889

(22) Filed: Dec. 22, 2016

(65) Prior Publication Data

US 2018/0183941 A1    Jun. 28, 2018

(51) Int. Cl.
*H04N 1/00* (2006.01)
*H04N 5/232* (2006.01)

(52) U.S. Cl.
CPC ..... *H04N 1/00029* (2013.01); *H04N 1/00015* (2013.01); *H04N 1/00058* (2013.01); *H04N 1/00076* (2013.01); *H04N 5/23293* (2013.01)

(58) Field of Classification Search
None
See application file for complete search history.

(56) References Cited

U.S. PATENT DOCUMENTS 5,253,167 A * 10/1993 Yoshida ............. G06Q 20/1085
235/379
6,832,725 B2   12/2004 Gardiner et al.
6,980,688 B2   12/2005 Wilk
7,128,266 B2   10/2006 Zhu et al.
7,159,783 B2    1/2007 Walczyk et al.
7,413,127 B2    8/2008 Ehrhart et al.
7,502,068 B2 *  3/2009 Narayanaswami ..........
G01N 21/8803
348/125
7,726,575 B2    6/2010 Wang et al.
7,952,641 B2    5/2011 Narayanaswami et al.
(Continued)

FOREIGN PATENT DOCUMENTS

WO    2013163789 A1   11/2013
WO    2013173985 A1   11/2013
(Continued)

OTHER PUBLICATIONS

U.S. Appl. No. 14/715,916 for Evaluating Image Values filed May 19, 2015 (Ackley); 60 pages.
(Continued)

*Primary Examiner* — Paul F Payer
(74) *Attorney, Agent, or Firm* — Additon, Higgins & Pendleton, P.A.

(57) ABSTRACT

A printer is provided. The printer has a printer body enclosing an interior, a screen, a camera, and a processor communicatively coupled to the camera. The screen overlies an exterior of at least a portion of the printer body. The camera is disposed within the interior and is configured to capture an image hereof. The processor is configured, by an analytical diagnostic software program, to display the captured image on the screen, thereby simulating a see-through view into the interior. Methods are also provided for identifying a source of a problem in the printer.

21 Claims, 4 Drawing Sheets

(56) References Cited

U.S. PATENT DOCUMENTS

| | | | |
|---|---|---|---|
| 8,040,542 B2 * | 10/2011 | Oda | G03G 15/5016 101/484 |
| 8,102,548 B2 * | 1/2012 | Buchheit | G05B 23/0229 358/1.14 |
| 8,277,183 B2 | 10/2012 | Qu | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |
| 8,910,870 B2 | 12/2014 | Li et al. | |
| 8,910,875 B2 | 12/2014 | Ren et al. | |
| 8,914,290 B2 | 12/2014 | Hendrickson et al. | |
| 8,914,788 B2 | 12/2014 | Pettinelli et al. | |
| 8,915,439 B2 | 12/2014 | Feng et al. | |
| 8,915,444 B2 | 12/2014 | Havens et al. | |
| 8,916,789 B2 | 12/2014 | Woodburn | |
| 8,918,250 B2 | 12/2014 | Hollifield | |
| 8,918,564 B2 | 12/2014 | Caballero | |
| 8,925,818 B2 | 1/2015 | Kosecki et al. | |
| 8,939,374 B2 | 1/2015 | Jovanovski et al. | |
| 8,942,480 B2 | 1/2015 | Ellis | |

(56) References Cited

U.S. PATENT DOCUMENTS

| | | |
|---|---|---|
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,235,819 B2 * | 1/2016 | Torii .................. G06F 11/0733 |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,369,760 B2 * | 6/2016 | Jacobsen .......... H04N 21/43637 |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 2007/0063048 A1 | 3/2007 | Havens et al. |
| 2009/0134221 A1 | 5/2009 | Zhu et al. |
| 2009/0190187 A1 * | 7/2009 | Cornell ................ B41J 29/393 |
| | | 358/474 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0207812 A1 | 8/2013 | Heydlauf |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |

(56) References Cited

U.S. PATENT DOCUMENTS

| | | |
|---|---|---|
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 29/525,068 for Tablet Computer With Removable

(56) References Cited

OTHER PUBLICATIONS

Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/740,373 for Calibrating a Volume Dimensioner filed Jun. 16, 2015 (Ackley et al.); 63 pages.
Wikipedia, "Tower Infinity", 3 pages, Dated Sep. 2013 Retrieved from "https://en.wikipedia.org/w/index.php?title=Tower_Infinity&oldid=707435812".
Conmark, "Paper Machine Video Monitoring Application Software," 2 pages, Retrieved from "http://www.conmark.com/products/videomonitoring.htm" on Apr. 14, 2016.
Printronix "PRINTCART Brochure", 2 pages, Dated Jul. 26, 2010; [Downloaded on Dec. 2, 2016 form http://printronixautoid.com/product/thermal-en/printcart/].
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.

\* cited by examiner

PRINTERS AND METHODS FOR IDENTIFYING A SOURCE OF A PROBLEM THEREIN

FIELD OF THE INVENTION

The present invention relates to printers and more particularly to methods for identifying a source of a problem therein.

BACKGROUND

Generally speaking, when a printer experiences a problem, the source and severity of the problem can be difficult to identify. While an error message may be sent to a user, the error message may lack sufficient detail, there can be multiple reasons for the problem, the source of the problem cannot be identified or is misidentified, and/or the error message may not correspond to the root source of the problem. The user may have to open the printer and spend time and energy trying to identify the source of the problem. Opening the printer may not even be possible in some installations where the printer is locked closed to prevent tampering and/or where the user is remote. The problem can be an error or a near error. A near error is a problem that requires attention so that it does not develop into an error.

A printer may also provide an alert to the user about the near-error therein. For example, the printer may have a thermal print head that needs cleaning, a ribbon roll and/or media roll nearing depletion, etc. Unfortunately, the source of the near-error may not be easily identified by the user and/or the source of the error may be misidentified.

As a result, the user may experience frustration and stress in identifying the source of the problem and/or a near-error alert may be missed, causing frustration and stress as well as possibly increasing printer downtime.

Therefore, a need exists for printers and methods for correctly identifying a source of a problem therein.

SUMMARY

A printer is provided, in accordance with various embodiments of the present invention. The printer has a printer body enclosing an interior, a screen, a camera, and a processor communicatively coupled to the camera. The screen overlies an exterior of at least a portion of the printer body. The camera is disposed within the interior and is configured to capture an image hereof. The processor is configured, by an analytical diagnostic software program, to display the captured image on the screen, thereby simulating a see-through view into the interior.

A method is provided for identifying a source of a printer problem, in accordance with various embodiments of the present invention. The method comprises displaying a captured image on a screen overlying an exterior of at least a portion of the printer body and visually highlighting at least a portion of the captured image on the screen. The captured image comprises an image of the interior of the printer such that the captured image, when displayed, simulates a see-through view into the interior of the printer. The visually highlighted portion displays the source of the problem in the printer.

A method is provided for identifying a source of a printer problem, in accordance with various embodiments of the present invention. The method comprises displaying a first captured image on a screen overlying an exterior of at least a portion of the printer body and displaying a second captured image on the screen. The first captured image comprises a first level view of at least a portion of an interior of the printer. The portion comprises the source of the printer problem. The second captured image is displayed if a root source of the printer problem cannot be identified from the first captured image. The second captured image comprises a second level view of at least the portion of the interior of the printer.

The foregoing illustrative summary, as well as other exemplary objectives and/or advantages of the present invention, and the manner in which the same are accomplished, are further explained within the following detailed description and its accompanying drawings.

DETAILED DESCRIPTION

Various embodiments are directed to printers and more particularly to methods for identifying a source of a problem in a printer. Various embodiments provide recognizable error and near-error alerts and permit easier and faster troubleshooting of the error and near-error. Various embodiments reduce user frustration and stress and reduce printer downtime. Various embodiments also allow the user to easily see and verify the error or near-error even though the actual source of the problem is inside the printer and is not visible without opening the printer and spending time and energy troubleshooting the problem. Various embodiments also provide an indication as to the severity of the problem, i.e., whether it is an error or a near-error. Various embodiments also provide various levels of visibility, significantly improving the ability to identify the source/root-source of the error or near-error and also enabling remote identification of the source and remote troubleshooting.

As used herein, the term "printer" refers to a device that prints text, barcodes and other information-bearing indicia, illustrations, etc. onto print media (e.g., labels, tickets, plain paper, receipt paper, plastic transparencies, and the like). Various embodiments of the present invention will be described in relation to a thermal transfer printer that uses an ink ribbon to supply media (e.g., ink) and a thermal print head that thermally transfers a portion of the ink from the ink ribbon onto the print media as the ink ribbon is unwound. However, the present invention may be equally applicable to other types and styles of printers that may benefit from identifying and troubleshooting errors and near-errors in therein.

As used herein, the term "problem" refers to an error in the printer that has caused or will cause printer shutdown or a "near-error" that requires attention but has not developed into an error. The severity of the problem depends upon whether the problem is an error or a near-error. The error is more severe than the near-error. Exemplary errors include, but are not limited to, a ribbon-loading error, a print media-loading error, a thermal print head lifted out of operating position, a depleted ribbon roll, a depleted media roll, a loose cable, a broken or loose connector, etc. Exemplary near-errors include, but are not limited to, a thermal print head needing cleaning, a ribbon roll nearing depletion (herein "a nearly-depleted ribbon roll"), a media roll nearing depletion (herein a "nearly-depleted media roll"), etc. As used herein, a "source" of the error or near-error refers to the general location or place within the printer interior (i.e., within a printer body) from where the error or near-error is originating. As used herein, the "root-source" is the specific location or place within the printer interior from where the error or near-error is originating. In some instances, unless otherwise specified, a "source" may be the same as the "root-source".

Figure 1:
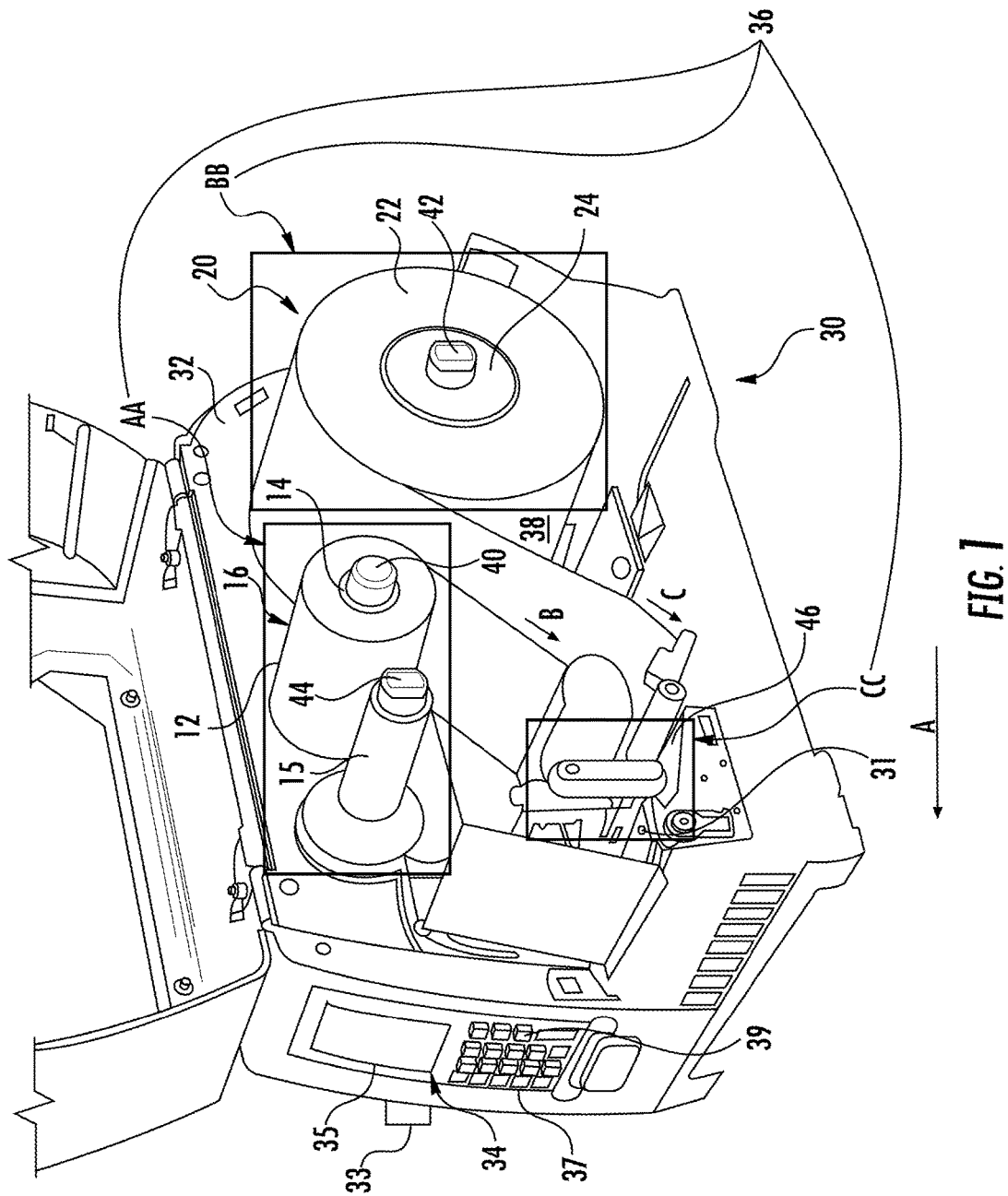
FIG. 1 graphically illustrates a portion of an exemplary printer that may be used in methods for identifying a source of a problem in the printer according to various embodiments, a cover of the printer removed (i.e., an open printer) to illustrate an interior of the printer with an exemplary ribbon path B of an ink ribbon and a media path C of the print media and different exemplary modules AA-CC within the printer interior, according to various embodiments of the present invention.

Now referring to FIG. 1, according to various embodiments, an exemplary printer 30 capable of printing on print media 22 is partially shown. The depicted printer 30 has a printer body 32 including a user interface 34 for communication between a user and the printer 30, a processor 33, a print control assembly 36, a power source, and a moveable cover (removed in FIGS. 1 and 2 for purposes of illustration) for accessing, for example, an interior 38 of the printer body 32 (i.e., the interior of the printer) and the components contained therein. The moveable cover forms a portion of the printer body 32. The printer 30 may have other components as known in the art, such as a print slot from which the printed media exits from the printer 30, and a cutting assembly for assisting in the cutting or separation of the printed medium from non-continuous print media.

Still referring to FIG. 1, the user interface 34 may include, but is not limited to, a display 35 for displaying information, a keypad 37 for entering data, and function buttons 39 that may be configured to perform various typical printing functions (e.g., cancel print job, advance print media, and the like) or be programmable for the execution of macros containing preset printing parameters for a particular type of print media. Additionally, the user interface 34 may be operationally/communicatively coupled to the processor (CPU) 33 for controlling the operation of the printer 30, in addition to other functions discussed below in greater detail. The user interface 34 may be supplemented by or replaced by other forms of data entry or printer control such as a separate data entry and control module linked wirelessly or by a data cable operationally coupled to a computer, a router, or the like. The user interface may be other than depicted in FIG. 1 and there may not be a user interface.

As known in the art, the central processing unit (CPU) (i.e., the processor 33) is the electronic circuitry within a computer that carries out the instructions of a computer program (e.g., the analytical diagnostic software program) by performing the basic arithmetic, logical, control and input/output (I/O) operations specified by the instructions as hereinafter described. Sensors in the printer may be used to receive signals representing data that may be analyzed or otherwise used by the analytical diagnostic software program.

According to various embodiments of the present invention, the processor 33 is configured by an analytical diagnostic software program to perform the steps as hereinafter described. In accordance with various embodiments as hereinafter described, the processor 33 is configured, by the analytical diagnostic software program, to detect the error or near-error, display the captured image on the screen, and visually highlight a portion of the captured image, the highlighted portion of the captured image comprising the source of the problem (error or near-error). The processor may be further configured, by the analytical diagnostic software program, to visually highlight the portion of the captured image in a manner indicating the severity (i.e., an error or near-error) of the problem.

Still referring to FIG. 1, according to various embodiments of the present invention, the print control assembly 36 comprises a ribbon module (encircled region AA in FIG. 1), a media module (encircled region BB in FIG. 1), and a thermal print head module (encircled region CC in FIG. 1). The encircled regions of FIG. 1 are generally depicted and do not constitute a representation of the exact boundaries of a particular module. The ribbon module comprises a ribbon supply spindle 40 on which a ribbon roll 16 is configured to be disposed and a ribbon rewind spindle 44 on which unwound ribbon is wound up. The ribbon roll 16 comprises ink ribbon 12 continuously wound up on a ribbon core 14 that may be, for example, a cardboard tube. As used herein, the ink ribbon 12 may be of various types, including different widths, lengths, thicknesses, ink colors, ribbon materials, and so forth. The ribbon roll 16 is configured to rotate in a forward or a backward rotational direction, depending on the winding type.

The media module comprises a media supply spindle 42 on which a media roll 20 is configured to be disposed. The media roll 20 comprises print media 22 wound on a media core 24. As noted previously, the print media 22 may comprise labels, tickets, plain paper, receipt paper, plastic transparencies, and the like. The print media may be continuous or non-continuous. An empty ribbon take 15 may be disposed on the ribbon rewind spindle 44 although the empty ribbon take 15 on the ribbon rewind spindle 44 may not be necessary. The thermal print head module (CC in FIG. 1) comprises a thermal print head 31 as hereinafter described.

To load the printer 30, a ribbon roll leading edge may be pulled forward (arrow A in FIG. 1) along a ribbon path (arrow B in FIG. 1) above a stop sensor 46 of the print control assembly 36 and attached to the ribbon rewind spindle (with, for example, tape on the empty ribbon take 15). The ribbon rewind spindle 44 is rotated until the ribbon overlaps the ribbon leading edge and stretches tight. The media roll 20 is inserted onto the media supply spindle 42 and threaded through the printer along a media path (arrow C in FIG. 1). The printer further comprises one or more motors (not shown) and gear sets (e.g., an image of a gear set 56 is depicted in FIG. 4C) for rotating the ribbon supply spindle 40 and the ribbon roll disposed thereon in a forward or a backward rotational direction (dependent on the ink surface), for rotating the media supply spindle 42 and the media roll disposed thereon in a forward rotational direction, and for rotating the ribbon rewind spindle 44. The stop sensor 46 is communicatively coupled to the processor (CPU) 33. The stop sensor 46 detects the presence of the print media in the printer before the thermal print head 31 and outputs an analog signal 68 to the processor 33 representing the presence or absence of print media in the printer.

The printer 30 further comprises the thermal print head in the thermal print head module (encircled region CC of FIG. 1) along the media path C utilized to thermally transfer a portion of ink from the ink ribbon to print media 22 as the ink ribbon is unwound from the ribbon core along the ribbon path B and the print media is unwound from the media core along the media path C. The printer 30 and print control assembly 36 may have other components or fewer components as known in the art.

Figure 5:
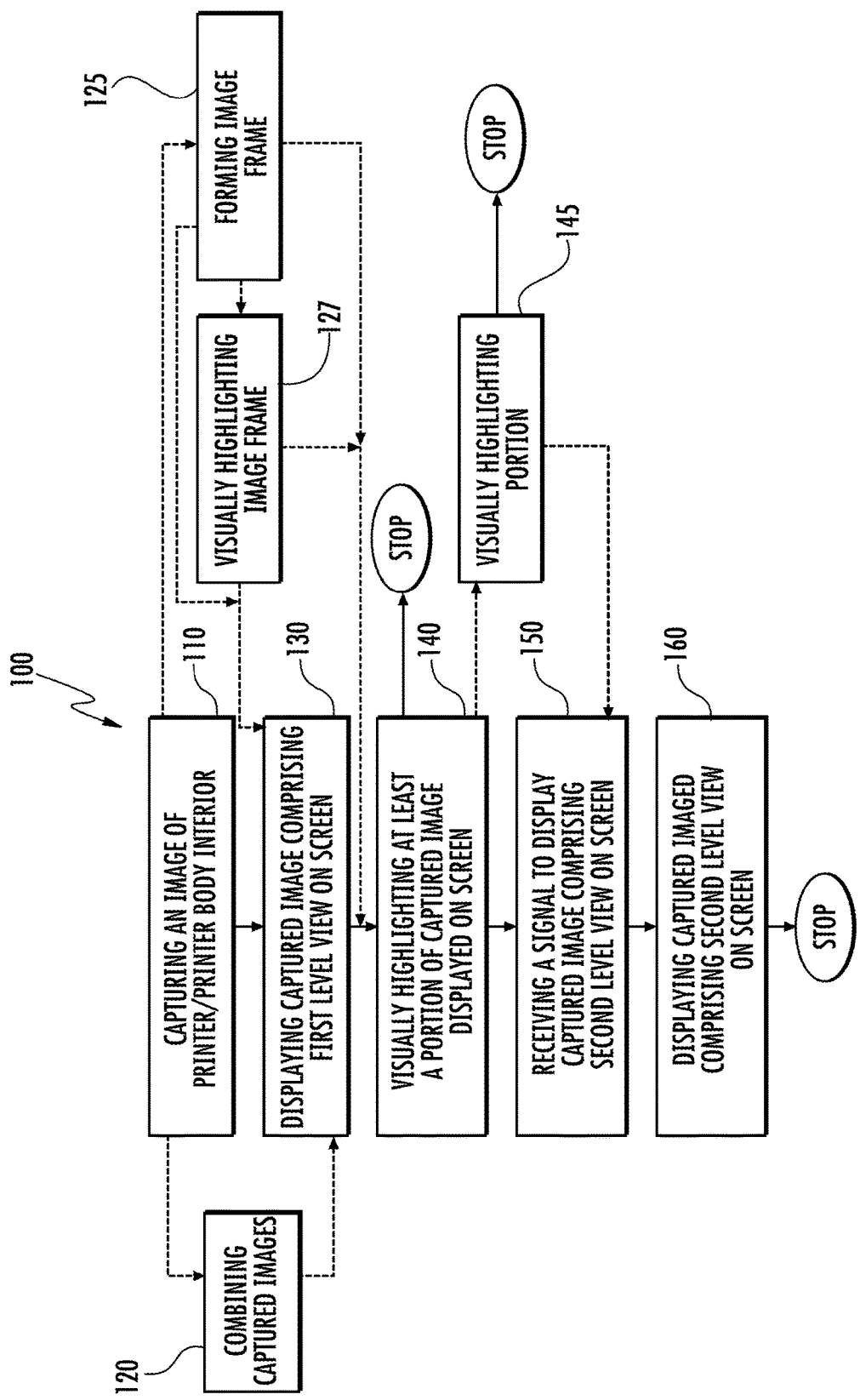
FIG. 5 is a flow diagram of a method for identifying a source of a problem in a printer, according to various embodiments of the present invention.

Referring now to FIG. 5, according to various embodiments of the present invention, a method 100 for identifying a source of a problem in the printer (such as exemplary printer 30 in FIG. 1) is illustrated. The method 100 for identifying the source of the problem in the printer begins by capturing an image of the interior of the printer body (step 110).

Figure 2:
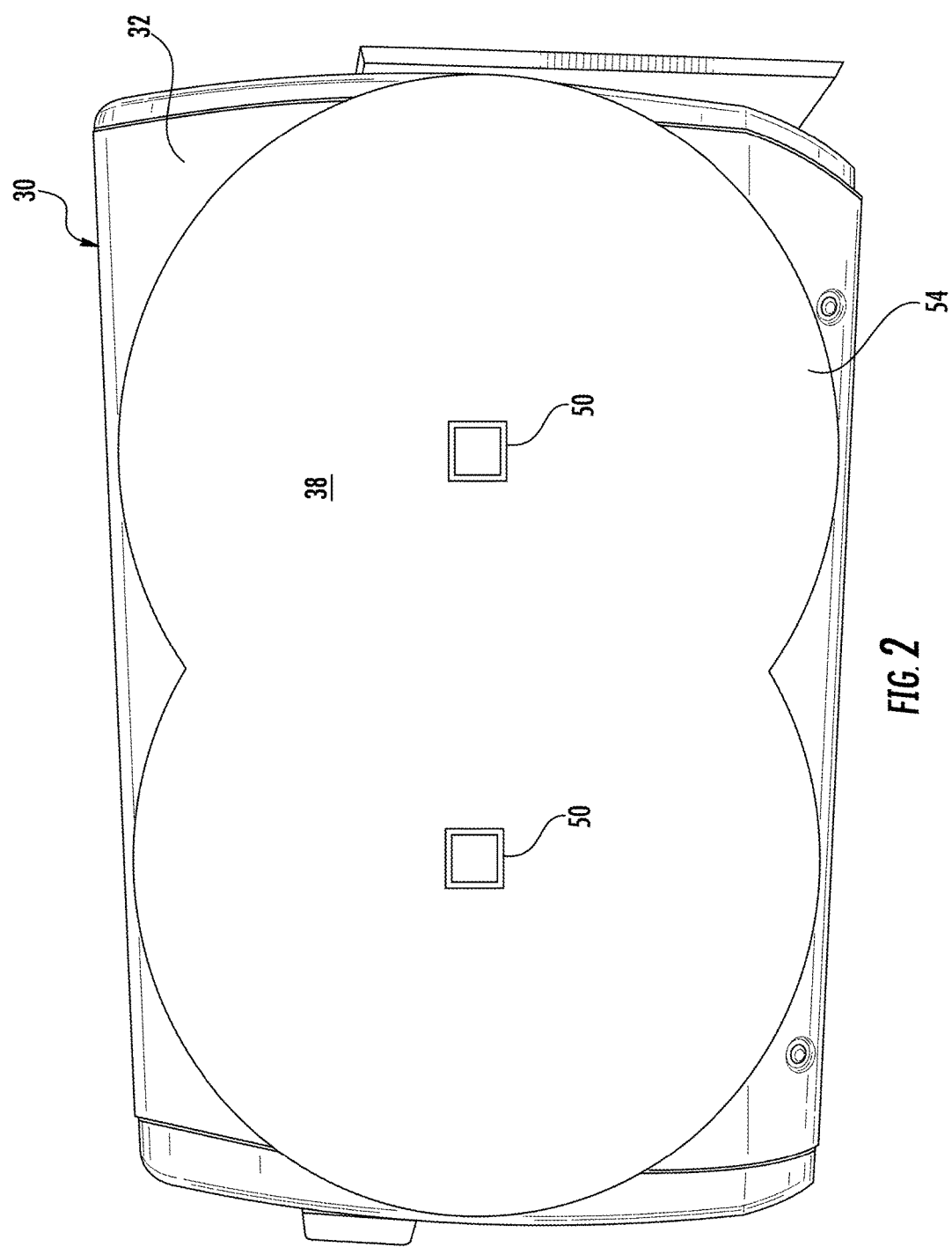
FIG. 2 schematically depicts an exemplary pair of cameras within the interior of the printer and their respective field of view for capturing an image (a "captured image") for display on a screen overlying an exterior of at least a portion of the printer body, creating a simulated see-through view into the interior of the printer, according to various embodiments of the present invention.

Referring now briefly to FIG. 2, and to FIGS. 3A through 4C, according to various embodiments of the present invention, the printer 30 further comprises one or more cameras 50 (schematically shown in FIG. 2) positioned within the interior 38 of the printer (more particularly, the printer body 32) and a screen 52 (FIGS. 3A through 4C) overlying the exterior of at least a portion of the printer body 32. The one or more cameras that may be used are known to one skilled in the art and will not be described in detail here.

In general, the one or more cameras are each configured to capture an image of the interior 38 of the printer 30 (more particularly, to capture an image of a location or place within the interior of the printer body 32). The image may be a still image or a video image. The one or more cameras 50 may be specially configured to be able to capture images within a dark interior of the printer body and within close range. The one or more cameras may be configured to capture images within the dark interior, whether by illumination or otherwise. The one or more cameras may be positioned within the interior of the printer body such that the collective field of view (54 in FIG. 2) for the one or more cameras is substantially the entire interior of the printer body. Alternatively, each camera may be configured to capture an image of a discrete location (e.g., the ribbon module (AA of FIG. 1)) within the interior 38 of the printer body or an image of a general location within the interior 38 of the printer body.

For example, a first camera may be positioned within the interior of the printer body to capture an image of a first location within the interior of the printer body while a second camera may be positioned to capture an image of an adjacent or spaced-apart second location within the interior of the printer body. The first location may be a forward interior portion of the printer and the second location may be an aft interior portion of the printer. The position of the one or more cameras within the interior of the body may be selected to focus in on known problem areas of the printer, i.e., locations where printer errors and near-errors conventionally occur. These may include, for example, the ribbon module (encircled region AA in FIG. 1), the media module (encircled region BB in FIG. 1), the thermal print head module (encircled region CC in FIG. 1), etc. Of course, problems may occur in other locations within the printer, for example, in an electronic board within the printer body (e.g., a loose cable, a broken or loose connector, etc.).

While two cameras are depicted in FIG. 2, it is to be understood that there may be a fewer or a greater number of cameras positioned within the interior of the printer body. As noted previously, the one or more cameras 50 may each be configured to capture a close-up image of a location or place within the interior of the printer body (i.e., a captured image). The captured image is configured to be displayed on the screen 52 overlying the exterior of at least a portion of the printer body. The one or more cameras may capture the same location, but with different levels of visibility, according to various embodiments.

Figure 3A:
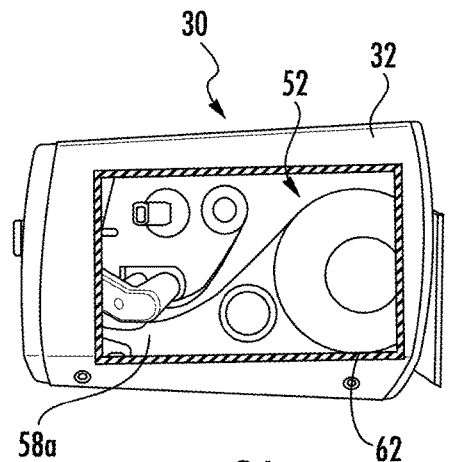
FIG. 3A depicts the printer of FIG. 1 in a normal ready-to-print state, with an exemplary captured image on the screen overlying the exterior of at least the portion of the printer body, creating the simulated see-through view into the interior of the printer, according to various embodiments of the present invention.
Figure 3B:
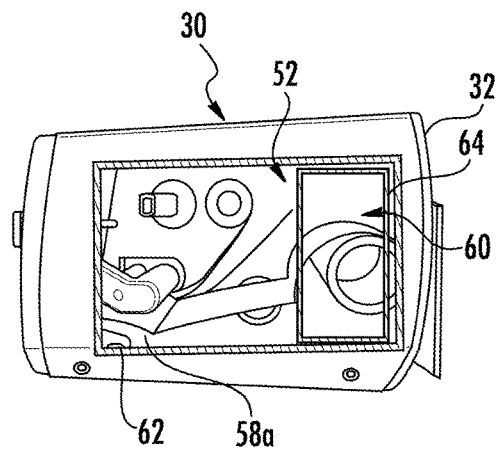
FIG. 3B depicts the printer of 3A with a portion of the captured image of FIG. 3A visually highlighted and displaying the source of a near-error in the printer, the exemplary depicted near-error comprising a nearly-depleted media roll, according to various embodiments of the present invention.

For example, a display of the captured image may comprise a first level view (FIGS. 3A through 4B) of the location with the same visual as if the cover of the printer were removed (e.g., FIG. 1) or a second level view (FIG. 4C) of the same location, but at a deeper level (more inboard within the interior of the printer body). The captured image may be a composited captured image. The captured image comprising the first level view is referred to hereinafter as captured image 58a. A visually highlighted portion 60 of the captured image 58a as hereinafter described may comprise the first level view (FIGS. 3B and 4B). The captured image comprising the second level view, as shown in FIG. 4C, is referred to as captured image 58b. The captured image 58a may also be referred to herein as a "first captured image" and captured image 58b may be referred to herein as "second captured image." The image comprising the second level view in captured image 58b may be captured in step 110 at the same time or a different time than captured image 58a. For example, captured image 58b may be captured just prior to step 150 as hereinafter described.

Still referring to FIGS. 3A through 4B, and again to FIG. 5, according to various embodiments of the present invention, the method 100 for identifying the source of the problem in the printer comprises an optional step of combining two or more captured images to form the composited captured image (optional step 120). The two or more captured images may be combined to form the captured image for purposes as hereinafter described (the "composited captured image"). The processor may be configured, by the analytical diagnostic software program, to combine the two or more captured images. The composited captured image may include extrapolated portions of the interior of the printer body that are not being captured on camera in the two or more captured images that are combined. The extrapolated portions could be of non-critical locations or places (i.e., those locations not conventionally prone to errors or near-errors) within the interior of the printer body.

Referring again to FIG. 5, according to various embodiments, the method 100 for identifying the source of the problem in the printer continues by displaying the captured image on a screen overlying the exterior of at least a portion of the printer body (step 130). Displaying the captured image on the screen 52 simulates a see-through view into the interior 38 of the printer 30/printer body 32 according to various embodiments of the present invention. When the captured image 58a (and captured image 58b) is displayed on the screen 52, it appears as though the user is looking at an open printer with the cover removed, such as shown in FIG. 1. The screen may be opaque but give the appearance of a transparent overlay when the captured image is displayed on the screen. The screen 52 overlying the exterior of at least a portion of the printer body comprises one or more screens. There may be one screen per camera if the field of view for each camera is far apart or for other reasons. There may be a single screen for displaying the captured image, such as a composited captured image.

In accordance with various embodiments of the present invention, the captured image 58a may be visually highlighted by surrounding the captured image 58a with an image frame 62 (step 125). The image frame 62 visually highlights the simulated see-through view into the printer interior and permits the user to monitor ink ribbon and print media consumption. In accordance with various embodiments of the present invention, the processor may display the captured image with the image frame (i.e., the processor overlays the image frame over the captured image prior to displaying the captured image) or the processor may visually highlight the captured image by digitally forming the image frame after the captured image is displayed.

In accordance with various embodiments of the present invention, the image frame 62 may itself be visually highlighted to indicate an error state of the printer (step 127). The image frame 62 may be visually highlighted in a manner indicating a no-error state, a near-error state, or an error state of the printer. For example, for the printer of FIG. 3A in the normal, ready to print state (i.e., a no error state), the image frame 62 surrounding the exemplary captured image 58a (the composited captured image) may be visually highlighted in a manner indicating the no-error state. In FIG. 3A, the image frame is visually highlighted by a selected color (indicated by the stippling of the image frame 62 in FIG. 3A) indicating the no-error state. For example, the image frame in FIG. 3A may be green to indicate a no-error state. In FIG. 3B, the image frame 62 is visually highlighted with a different color (indicated by different stippling of the image frame 62 in FIG. 3B). For example, the image frame 62 of FIG. 3B may be visually highlighted in yellow to indicate a near-error state. Of course, the image frame may be visually highlighted in other colors and/or the image frame may be visually highlighted by using other than color (i.e., other visual highlighting techniques to indicate the error state). The visual highlighting of the image frame 62 may provide a quick indicator of the error state.

Referring again to FIG. 5, according to various embodiments, the method 100 for identifying the source of the problem in the printer continues by visually highlighting at least a portion of the captured image 58a on the screen (step 140). The visually highlighted portion 60 displays the source (location or place within the interior of the printer) of the problem in the printer. The visually highlighted portion 60 may be further visually highlighted in optional step 145 to indicate the severity of the problem as hereinafter described. If the source of the problem can be identified from the visually highlighted portion 50 (whether the visually highlighted portion is further visually highlighted in step 145, the method stops.

Referring now again and specifically to FIGS. 3A through 3B, according to various embodiments of the present invention, FIG. 3A depicts the printer of FIG. 1 in a normal, ready-to-print state, with an exemplary composited captured image 58a displayed on a single screen 52 overlying the exterior of a portion (an exemplary side portion) of the printer body 32, creating the simulated see-through view into the interior 38 of the printer. In the normal, ready-to-print state (the no error-state), no problems are identified in the printer. As noted previously, the exemplary composited captured image 58a is surrounded by the image frame 62. The image frame 62 may be visually highlighted to indicate the no-error state.

In accordance with various embodiments of the present invention, FIG. 3B depicts the printer of FIG. 3A experiencing a near error (a nearly-depleted media roll), with the portion of the (composited) captured image 58a displayed on the screen 52 visually highlighted to identify the source (i.e., the media module) of the problem in the printer. As noted previously, the visually highlighted portion 60 of the captured image 58a comprises the first level view of the source of the problem. The portion 60 of the captured image is visually highlighted by a frame 64 that delineates, in the captured image 58a, the source of the problem.

The highlighted portion 60 of the captured image 58a in FIG. 3B may include text, for example, "Low Media" to describe the near-error. However, the text is not necessary as the user can identify the nearly-depleted media roll near-error from the highlighted portion 60 of the captured image 58a. Thus, the user may be provided advance warning that the media roll is nearly depleted. Development of the near error (nearly-depleted media roll) to an error (a depleted media roll) can be substantially avoided if the user replaces the media roll when the near-error is identified.

As noted previously, the visually highlighted portion may be further visually highlighted in optional step 145. For example, the frame 64 may be displayed in a color indicating the severity of the problem. The processor is configured to display the frame in the color indicating the severity of the problem. As noted previously, an error is more severe than a near-error. Thus, for example, the color of the frame 64 may be yellow indicating that the problem is a near-error whereas red may be used to indicate an error. The color of the image frame 62, if present, when the printer is experiencing a problem may be the same as or different from the color of the frame 64 highlighting the portion 60 of the captured image 58a. Of course, other colors and other visual highlighting techniques may be used to visually highlight the visually highlighted portion 60.

Figure 4A:
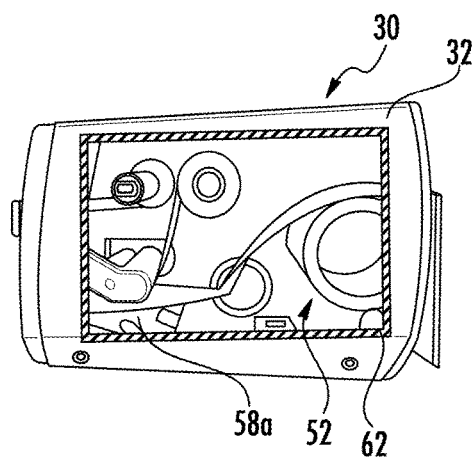
FIG. 4A is identical to FIG. 3A and depicts the printer of FIG. 1 in a normal ready-to-print state, with the captured image on the screen overlying the exterior of at least a portion of the body of the printer, according to various embodiments of the present invention.
Figure 4B:
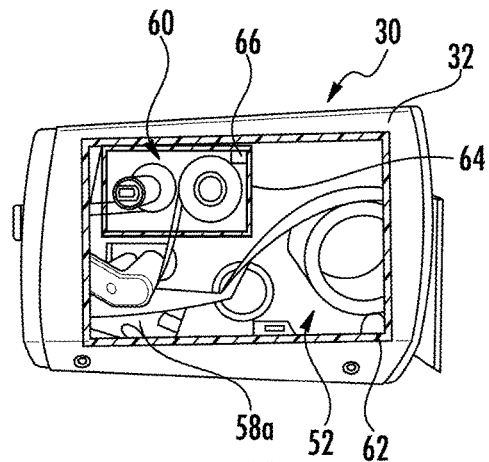
FIG. 4B depicts a visually highlighted portion of the captured image on the screen of FIG. 4A, the visually highlighted portion displaying the source of an error in the printer, the exemplary depicted error comprising a ribbon-loading error and the source comprising a ribbon module (AA in FIG. 1) in the printer, the visually highlighted portion including an exemplary function button indicating the availability of at least one second level view of the source and in response to being touched, for displaying the second level view, according to various embodiments of the present invention.
Figure 4C:
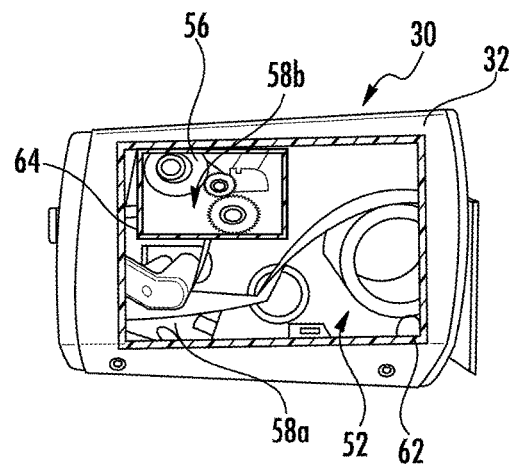
FIG. 4C depicts the printer of FIG. 4B with the captured image comprising the first level view displayed on the screen with the visually highlighted portion comprising a captured image comprising the second level view of the source also displayed on the screen, the exemplary second level view of the ribbon module (the source) displaying a broken gear thereof as the source of the ribbon loading error, according to various embodiments of the present invention.

Referring now to FIGS. 4A through 4C, according to various embodiments of the present invention, FIG. 5A depicts, identically to FIG. 4A, the printer of FIG. 1 in a normal, ready-to-print state, with the (composited) captured image 58a (a first level view) displayed on the screen 52 overlying the side portion of the printer body, creating a simulated see-through view into the interior 38 of the printer. The display of the captured image 58*a* may be surrounded by the image frame 62 as previously described (in step 125). As previously noted, the image frame 62 visually highlights the simulated see-through view into the printer interior and permits the user to monitor ink ribbon and print media consumption. As noted previously, the image frame 62 may itself be visually highlighted in step 127. For example, as noted previously, the image frame may be a selected color that indicates the error state of the printer. For example, for the printer of FIG. 4A in the normal, ready to print state (i.e., a no error state), the image frame 62 surrounding the exemplary captured image 58*a* (the composited captured image) may be green. Of course, the image frame may be other colors, the image frame may be visually highlighted by using other than color (i.e., other visual highlighting techniques to indicate the error state), and there may be no image frame, according to various embodiments. The visual highlighting provides a quick indicator of the error state.

Now referring specifically to FIG. 4B, in accordance with various embodiments of the present invention, FIG. 4B depicts the printer of FIG. 4A experiencing an error (an exemplary ribbon loading error), with the portion 60 of the captured image 58*a* displayed on the screen 52 visually highlighted to identify the source (in this case, the ribbon module) of the problem in the printer. As in FIG. 3B, the portion 60 of the captured image 58*a* is visually highlighted in step 140 with the frame 64 that delineates, in the captured image, the source of the problem. As noted previously, the frame may be visually highlighted in step 145 by displaying the frame in a color indicating the severity of the problem. As an error is more severe than a near-error, the color of the frame may be red indicating that the problem is an error, and not a near-error. The color of the frame may be other than red. The color of the image frame 62, if present, when the printer is experiencing a problem may be the same as or different from the color of the frame 64 highlighting the portion 60 of the captured image 58*a*. Visual highlighting techniques instead of, or in addition to color, may be used to visually highlight the frame to indicate the severity of the problem. The portion 60 of the captured image 58*a* of FIG. 4B comprises a first level view of the source of the problem.

The highlighted portion of FIG. 4B may include text, such as "Ribbon Loading Error", describing the error. However, such text is not necessary as the user may (or may not) be able to identify the source of the problem from a visual check of the highlighted portion 60 of the captured image 58*a* on the screen. For example, a user performing the visual check of the highlighted portion 60 of FIG. 4B can see that there is still ample ink ribbon 12 in the ribbon roll 16 (FIG. 1) and that the ink ribbon is routed correctly. Therefore, the user of the printer depicted in FIG. 4B cannot really identify or triage the source of the printer problem from the highlighted portion 60 of the captured image 58*a*. Therefore, as herein described, the user may thereafter request a deeper view (i.e., the second level view) of the ribbon module (AA of FIG. 1).

Still referring to FIG. 4B, according to various embodiments of the present invention, the visually highlighted portion 60 of the displayed captured image 58*a* may include a function button 66 indicating the availability of multiple views of the source of the problem, i.e., at least one second level view of the source of the problem (i.e., the ribbon module in the depicted embodiment). The function button 66 may be touched by the user for outputting a signal to the processor 33 (FIG. 1) representing the request for the captured image 58*b* comprising the second level view of the source of the problem if the user is unable to identify or triage the problem from the first level view. The function button 66 may be touched for commanding the processor to display the captured image 58*b* comprising the deeper second level view of the source of the problem (i.e., the ribbon module in the depicted embodiment). There may be additional or alternative methods for commanding the processor to display the captured image 58*b* comprising the deeper second level view of the source of the problem.

Referring again to FIG. 5, according to various embodiments, the method 100 for identifying a source of a problem in a printer comprises receiving the signal representing the request of the user for the captured image 58*b* comprising the second level view (step 150). The processor in the printer receives the signal, and in response thereto, displays the captured image 58*b* comprising the second level view. There may be more than one available second level view, with each successive second level view capturing the source of the problem deeper into the interior of the printer. The second level view provides a deeper view into the source of the problem relative to the first level view. The second level view may be necessary to identify the root source of the error or near-error in the printer. In various embodiments, the second level view may be unnecessary to identify the source of the problem (e.g., FIG. 3A).

Referring again to FIG. 6, according to various embodiments, the method for identifying a source of the problem in the printer continues by displaying the captured image 58*b* comprising the second level view on the screen (step 160). Referring now specifically to FIG. 4C, according to various embodiments of the present invention, FIG. 4C depicts the screen 52 on the printer of FIGS. 4A and 4B displaying the captured image 58*b* comprising the second level view overlaid over portion 60 of captured image 58*a*. In FIG. 4C, the captured image 58*b* is visually highlighted because the frame is maintained to delineate captured image 58*b* comprising the second level view from captured image 58*a*. In the depicted embodiment, the captured image 58*b* comprising the second level view shows an image of the broken gear set 56 of the ribbon module AA (FIG. 1). By requesting the deeper second level view, the user is able to identify the root source of the problem in the printer (in the depicted embodiment, that the broken gear set 56 is causing the ribbon loading error).

While FIG. 4C illustrates the captured image 58*b* overlying the portion 60 of the captured image 58*a* with the rest of the captured image 58*a* displayed to help orient the user, it is to be understood that at least a portion of the captured image 58*a* may be replaced with captured image 58*b* (i.e., captured image may overlie portion 60 or another portion of captured image 58*a* or captured image 58*a* itself may be replaced). The captured image 58*b* may be displayed in some other manner on screen 52 (e.g., in addition to portion 60). The captured image 58*b* may be visually highlighted in a separate step if necessary (i.e., frame 64 is not maintained).

While using the image frame 62 to visually highlight the simulated see-through view into the interior of the printer and the frame 64 to visually highlight the portion 60 of the captured image 58*a* and captured image 58*b* (if displayed), it is to be understood that the simulated see-through view, the portion 60 of captured image 58*a*, and/or captured image 58*b* may be visually highlighted in a manner other than using an image frame/frame and the error state/severity of the problem may be indicated by using other than color. In addition, while exemplary colors for the frame and image frame have been described for indicating the error state/ severity of the problem, it is to be understood that any color may be used. For example, the error state may be indicated by visually highlighting the image frame 62 and/or the portion 60 of captured image 58a and/or captured image 58b may be visually highlighted and the severity of the problem may be indicated using brighter color, hue, tint, brightness, pattern, contrast, animation, intensity, special effects (e.g., flashing, underlining, etc.), or opacity different from the rest of the screen, or using any other visual highlighting technique that would alert the user to the source of the printer problem and/or its severity (error or near-error state). It should be understood that the above-described exemplary techniques for visually highlighting (including providing an indication of the severity of the problem) are exemplary and do not comprise an exhaustive list of techniques that may be employed by processor to provide visual highlighting.

Once the source of the problem has been identified, the user may press the screen anywhere outside of the visually highlighted portion or press the "X" in the upper right hand corner to exit the current view of the highlighted portion. Exiting the current view may return the view of the highlighted portion to the immediately preceding view or to the first level view, whichever is the case.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;

U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;

U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the present invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A printer having a printer body enclosing an interior, the printer comprising:
 a screen overlying an exterior of at least a portion of the printer body;
 a camera disposed within the interior and configured to capture an image of a location within the interior; and
 a processor communicatively coupled to the camera and configured, by an analytical diagnostic software program, to:
 display the captured image on the screen, thereby simulating on the screen a see-through view through the exterior of at least the portion of the printer body and into the interior.

2. The printer according to claim 1, wherein at least a portion of the captured image displays a source of a printer problem, wherein the processor is further configured to visually highlight at least the portion of the captured image displaying the source of the printer problem on the screen.

3. The printer according to claim 2, wherein the processor visually highlights at least the portion of the captured image on the screen in a manner indicating a severity of the problem.

4. The printer according to claim 2, wherein the processor visually highlights at least the portion of the captured image on the screen by delineating the portion with a frame and visually highlighting the frame in a selected color indicating the severity of the problem.

5. The printer according to claim 2, wherein the captured image comprises a first level view of the source of the problem.

6. The printer according to claim 2, wherein the captured image comprises a first captured image and a second captured image, the first captured image comprising a first level view of the source of the problem and the second captured image comprising a second level view of the source of the problem.

7. The printer according to claim 6, wherein the display of the first captured image includes a function button indicating the availability of the second captured image.

8. The printer according to claim 7, wherein the processor displays the second captured image comprising the second level view in response to a user touching the function button.

9. The printer according to claim 1, wherein the captured image comprises a composited captured image comprising a plurality of captured images, wherein the processor is further configured to combine the plurality of images into the composited captured image comprising a first level view.

10. A method for identifying a source of a problem in a printer, the method comprising:
 displaying a captured image on a screen overlying an exterior of at least a portion of the printer body, the captured image comprising an image of a location within an interior of the printer such that the captured image, when displayed, simulates on the screen a see-through view through the exterior of at least the portion of the printer body and into the interior of the printer; and
 visually highlighting at least a portion of the captured image on the screen, wherein the visually highlighted portion displays the source of the problem in the printer.

11. The method according to claim 10, wherein the captured image comprises a composited captured image comprising a plurality of images, the method further comprising combining the plurality of images into the composited captured image prior to displaying the captured image.

12. The method according to claim 10, wherein displaying a captured image comprises displaying the captured image comprising a first level view of the source of the problem.

13. The method according to claim 10, wherein displaying a captured image comprises displaying the captured image comprising a first captured image and a second captured image, the first captured image comprising a first level view of the source of the problem and the second captured image comprising a second level view of the source of the problem.

14. The method according to claim 13, wherein the display of the first captured image includes a function button indicating the availability of the second captured image comprising the second level view.

15. The method according to claim 14, further comprising:
 receiving a signal indicating that the function button has been touched by a user; and
 in response to the signal, displaying the second captured image comprising the second level view.

16. The method according to claim 10, wherein the severity of the problem in the printer is shown by variations in the visual highlighting, the problem comprising an error or a near-error, the error being more severe than the near-error.

17. The method according to claim 16, wherein the severity of the problem shown by variations in the visual highlighting comprises delineating at least a portion of the captured image on the screen with a frame and displaying the frame in a selected color indicating the severity of the problem.

18. A method for identifying a source of a printer problem, the method comprising:
 displaying a first captured image on a screen overlying an exterior of at least a portion of the printer body, the first captured image comprising a first level view of at least a portion of an interior of the printer, the portion comprising the source of the printer problem; and
 displaying a second captured image on the screen if a root source of the printer problem cannot be identified from the first captured image, the second captured image comprising a second level view of at least the portion of the interior of the printer.

19. The method according to claim 18, wherein the display of the first captured image comprising the first level view includes a function button indicating the availability of the second captured image comprising the second level view, the method further comprising:
 receiving a signal indicating that the function button has been touched by the user; and
 in response to the signal, displaying the second captured image comprising the second level view, wherein displaying the first captured image and the second captured image simulates a see-through view into the interior of the printer.

20. The method according to claim 18, further comprising visually highlighting at least the portion of the first captured image, the second captured image, or both the portion of the first captured image and the second captured image.

21. The method according to claim 20, wherein visually highlighting at least the portion of the first image, the second image, or both the portion of the first image and the second image comprises visually highlighting in a manner to indicate a severity of the problem comprising an error or a near-error, the error being more severe than the near-error.

* * * * *